Nov. 11, 1947.  A. A. BERNARD  2,430,701
WELDING ELECTRODE
Filed April 8, 1946  4 Sheets-Sheet 1
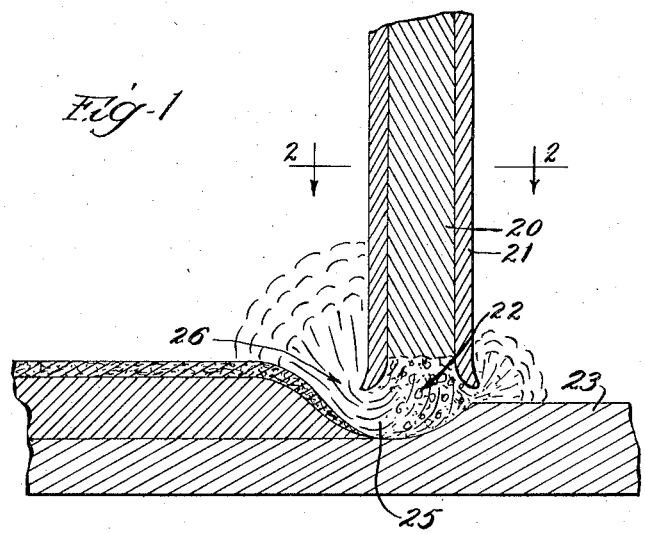
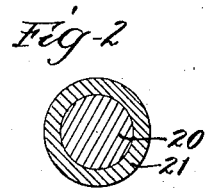
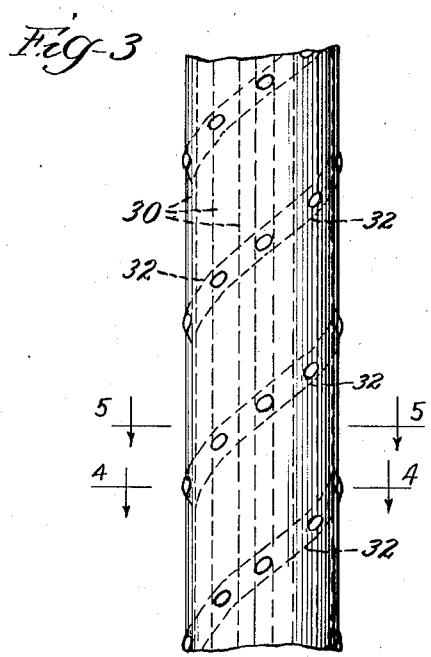
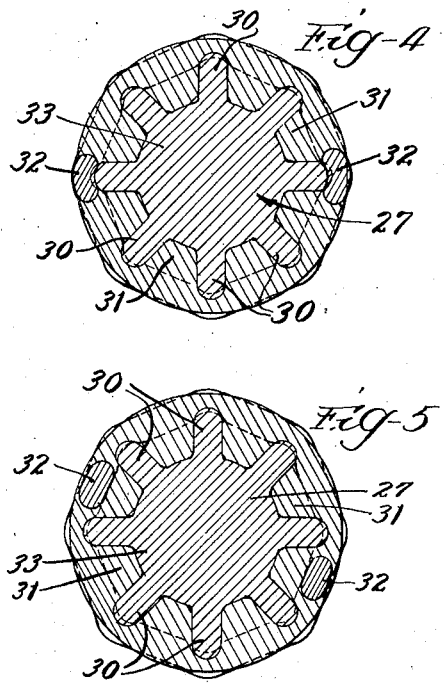
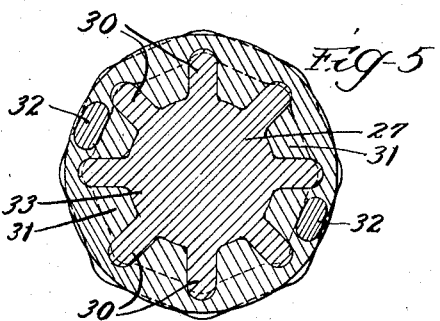
Inventor
Arthur A. Bernard
By: Mann and Brown
Attys.

Nov. 11, 1947.  A. A. BERNARD  2,430,701
WELDING ELECTRODE
Filed April 8, 1946  4 Sheets-Sheet 2
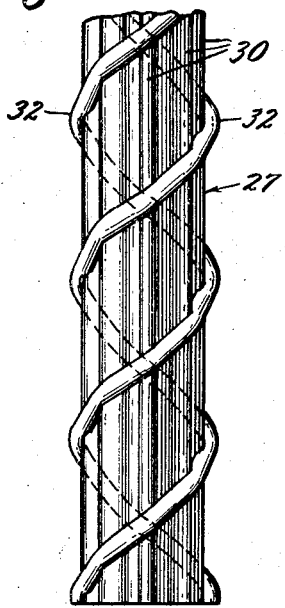
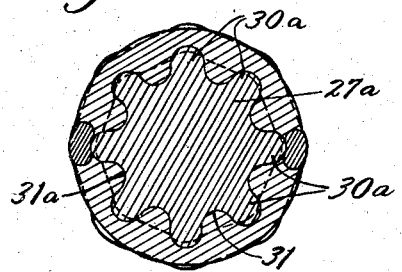
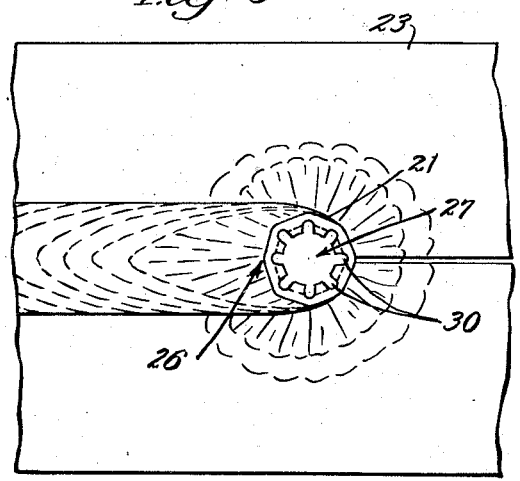
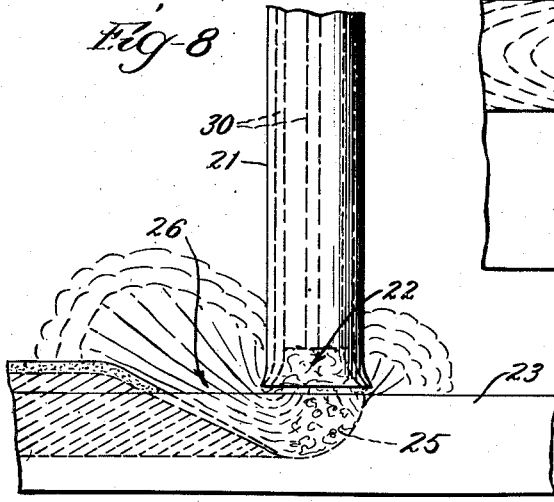
Inventor
Arthur A. Bernard.
By:- Mann and Brown
Attys.

Inventor
Arthur A. Bernard

Nov. 11, 1947.   A. A. BERNARD   2,430,701
WELDING ELECTRODE
Filed April 8, 1946        4 Sheets-Sheet 4
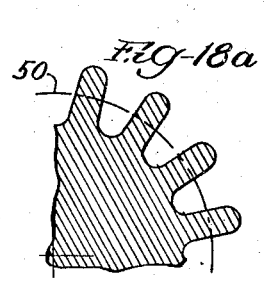
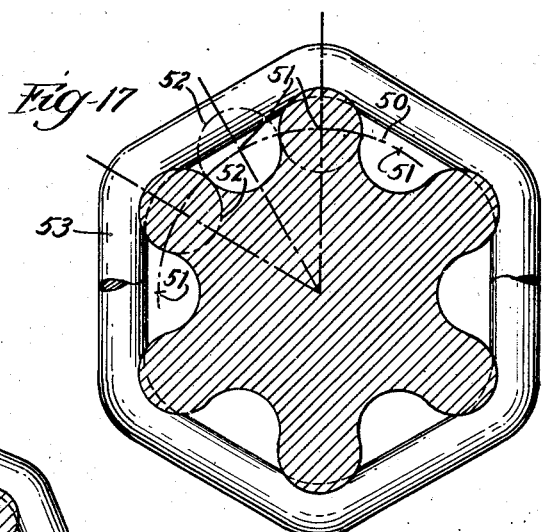
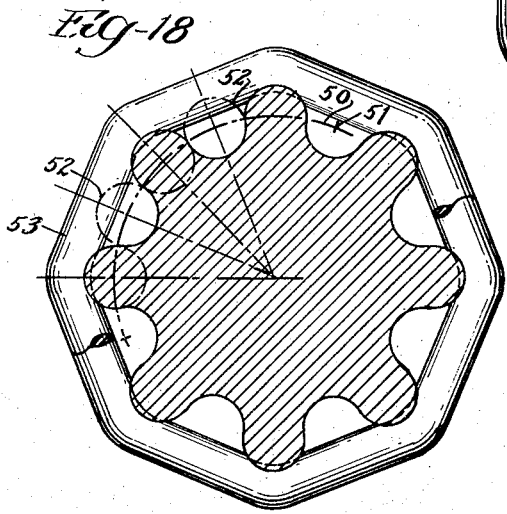
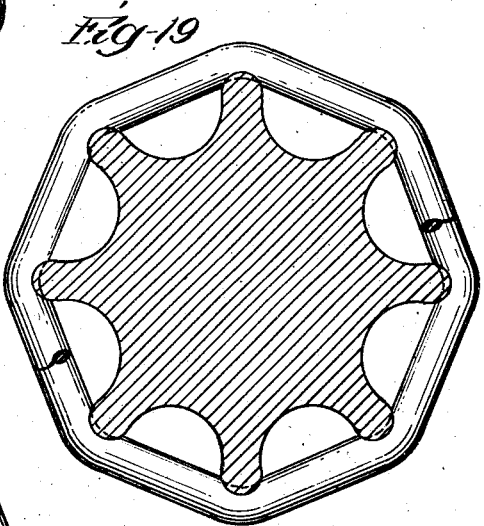
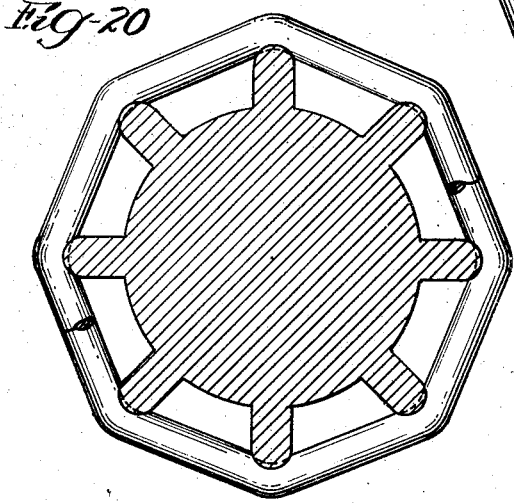
Inventor
Arthur A. Bernard Patented Nov. 11, 1947

2,430,701

UNITED STATES PATENT OFFICE 2,430,701

WELDING ELECTRODE

Arthur A. Bernard, Chicago, Ill., assignor to National Cylinder Gas Company, a corporation of Delaware Application April 8, 1946, Serial No. 660,331

26 Claims. (Cl. 219—8)

My invention relates to welding rods, more particularly to welding rods or electrodes for arc welding and is directed to an improved shielded electrode suitable for rapid and efficient automatic arc welding, as well as a method of producing such an electrode. The present application is a continuation-in-part of my copending application filed May 3, 1945, Serial No. 591,691, which copending application is made a part hereof by reference to the extent that the prior disclosure is consistent with the present disclosure.

A shielded electrode is one in which the flux incorporated in the electrode structure serves as the sole means for shielding the weld, that is to say, the flux coating provides shielding action in the course of the welding procedure which protects the molten weld metal from the oxygen and nitrogen of the atmosphere.

Heretofore shielded electrodes have been widely used for manual arc welding, such electrodes being provided in relatively short lengths with a portion of the metal electrode core exposed at one end to permit the flow of electric current to the core from the usual holder. The principal object of the present invention is to make available a shielded electrode that may be employed in long lengths for efficient and exceptionally rapid automatic arc welding.

A further object of the invention is to provide a relatively short shielded electrode that may be employed for manual arc welding to better advantage than conventional electrodes having a portion of the electrode core exposed at one end for electrical contact. In the first place, the usual uncoated portion of the welding rod must be discarded. In the second place, it is not feasible to reduce the ratio of this waste portion to the consumed portion of the rod by making the individual rods relatively long because the amount of heat generated by resistance in the rod varies with the distance of the holder from the arc and any excessive heating of the flux coating from such cause results in premature release of the available shielding gases from the flux coating.

In general the objects of the invention are attained by an electrode having a flux coated core of longitudinally ribbed construction, with one or more strands wound across the core and embedded in the flux. As will be explained, certain dimensional relationships are involved.

Certain specific objects of the invention relate to the structural relationships involved in the combination of a ribbed electrode core and one or more strands of wire wound around the ribs of the core. One of these specific objects is to provide such engagement between the ribs of the core and the applied strands as to prevent strippage of the wound strand longitudinally of the core. Preferably the engagement between the ribs and the strands is mutual to result in a novel interlocking relationship as will be explained below.

Another object is to provide such a combination in which there will be relatively little tendency for the spirally wound strand to unwind when free to do so.

A further object of the invention is to provide an efficient, rapid and inexpensive method of fabricating such a combination of ribbed core and spirally wound strand which method achieves the interlocking relationship between the strand and the ribs of the core, as well as provides the desired tendency of the strand to stay wound around the core.

Further objects and advantages of the invention may best be reserved for later discussion. The invention may be understood by reference to the following detailed description taken with the accompanying drawings.

In the drawings, which are to be considered as merely illustrative:

Figure 1 is a diagrammatic view in vertical cross section illustrating the principles involved in the use of a shielded electrode;

Figure 2 is a transverse section taken as indicated by the line 2—2 of Figure 1;

Figure 3 is a side elevation of one form of the electrode;

Figure 4 is a transverse section taken on the line 4—4 of Figure 3;

Figure 5 is a similar section taken along the line 5—5 of Figure 3;

Figure 6 is a side elevation of the rod structure before the flux coating is applied;

Figure 7 is a transverse section of a modified electrode core with spiral winding;

Figure 8 is a diagrammatic view of the shielded electrode in the course of a welding operation;

Figure 9 is a diagrammatic view in plan of the arrangement shown in Figure 8;

Figure 17 is a transverse sectional view of a preferred form of electrode core for relatively small electrode diameters, for example, ⅛ inch diameter;

Figure 18 is a similar view of a preferred form of electrode core for somewhat larger diameters, say, ¼ inch diameter;

Figure 18a is a fragmentary section like Figure 18 indicating another form of electrode; and Figures 19 and 20 are similar views of other forms of electrode cores that may be employed in other practices of the invention.

Figure 10:
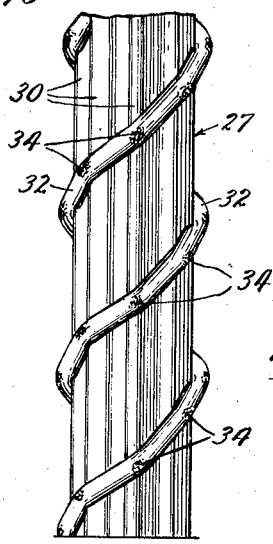
Figure 10 is a view similar to Figure 6 showing a spot-welded construction for the electrode.

Figures 1 and 2 show, in a diagrammatic and generalized manner, the construction of a shielded electrode and the kind of arc welding action to be sought. The electrode comprises an electrode core 20 of circular cross-section encased by a cylindrical coating or layer of flux 21. The consumption of the flux coating 21 in the course of the welding operation lags behind the consumption of the electrode core so that a portion of the flux coating extends downward from the lower end of the melting electrode, as shown. The following aspects of the illustrated construction and action are highly important.

1. In effect the arrangement shown in Fig. 1 creates a miniature electric furnace, which furnace is highly efficient since it operates in what may be termed an inverted crucible 22 formed by the lower end of the cylindrical flux coating 21. This crucible shields the melting zone from the atmosphere.

2. Since the cylindrical flux wall extending downwardly from the melting electrode confines the arc, an exceptionally high welding current can be employed without resulting in an unstable wandering arc.

3. Since the extended cylindrical flux wall provides an enclosed path for the transfer of the electrode metal in the form of vapor and droplets, the electrode metal cannot scatter to form weld splatter on the base metal 23.

4. Since the arc acting on the surrounding flux wall of the crucible generates gas by vaporization, combustion and the formation of transient chemical compounds, the arrangement shown in Figure 1 acts in effect as an internal combustion gas generator. Some constituents of the flux, however, are transformed by the arc into droplets of flux material for deposit on the base metal 23.

5. The downwardly extended cylindrical wall of flux serves as a conduit for conveying and directing the generated gas and the stream of flux particles from the zone of generation to the area of the base metal where shielding is desirable.

6. The cylindrical wall of flux extending downward substantially from the melting electrode exposes such an extensive area of flux to the arc, that the shielding gas is generated at an exceptionally high rate, especially when high amperage welding current is used.

7. Since the lower end or rim of the cylindrical flux wall is of substantially even configuration, and since this rim is maintained at only slight spacing from the base metal 23 in the course of the welding operation, the generated gas is confined to such extent as to produce relatively high gas pressure. The rate of gas generation is so high that the rim of the inverted crucible may be liberally spaced from the face of the base metal 23 without the admission of atmosphere.

8. As a result of the high rate of gas generation and the confined path of conveyance from the generation zone, the gaseous stream entraining droplets of flux and electrode metal is projected downwardly with such force and velocity as to form a substantial crater 25 in the base metal 23 immediately below the inverted crucible 22.

9. As a result of the downward force of the gaseous stream the crater 25 has substantial depth and the welding action penetrates deeply into the base metal 23. Great depth of penetration is attained by constructing the electrode for a high current density, for voluminous gas generation and for the maintenance of an efficient flux shield.

10. The major exit for the generated gases as the welding electrode travels in the course of the welding operation is through the opening 26 at the rear of the crater 25, the result being a rearward stream of gas to cover and shield the completed weld bead from the atmosphere as the weld is uncovered by the flux shield. Slag produced by the flux coating is driven rearward along the weld by this rearward stream of gas to protect the highly heated weld metal from the atmosphere as the shielding gas stream moves away.

In the fabrication of an ideal electrode to perform in the manner described, certain considerations pertaining to the flux coating must be kept in mind. In the first place, the flux coating must be consumed at a retarded rate to form the inverted crucible. In the second place, the flux coating must be of such thickness as to withstand the pressure of the confined gases. In the third place, the flux coating must be substantially continuous or free of troublesome apertures, to prevent any substantial escape of gases above the zone of clearance between the inverted crucible and the base metal. In the fourth place, the flux coating must be consumed in such uniform manner as to provide a relatively even rim, because any "fingers" of flux material extending downwardly from the inverted crucible may contact the weld and break off to penetrate and contaminate the molten weld metal.

With reference to retardation in the rate of flux consumption relative to the rate at which the electrode melts, and with reference to the thickness of the crucible wall, three factors are to be considered, viz: the thickness of the flux coating, the composition of the flux coating, and the amperes of welding current. In general, the higher the mineral content of the flux the greater the resistance of the flux to heat and therefore the less flux required. The thickness of the coating of a given flux composition will vary directly with the current density.

The ideal electrode for arc welding to perform in the general manner discussed above has been approached heretofore in the fabrication of electrode for manual welding. All welding rod heretofore fabricated for automatic welding has, however, fallen far short of the above ideal because of two difficult problems inherent in automatic welding. One of these problems is to provide an exceedingly long electrode for automatic welding that may be reeled at the factory, shipped and handled with only ordinary care, and then unreeled in the course of automatic welding without loosening of the flux coating and without damage to the flux coating. The other problem is to provide an electrode coated with substantially non-conducting flux of the required configuration and physical structure, and at the same time to provide for conducting current through such an insulating layer from the periphery of the electrode to the metal core.

It is an object of the present invention to approach closely an ideal electrode, as outlined above, that meets these two last discussed problems and is satisfactory for automatic welding at a higher rate of weld production than heretofore attained in the art. The specific manner in which this object is achieved may be understood by considering the embodiment of the present invention shown in Figures 3 to 6, which embodiment will now be described.

The new welding rod has a core 27 of suitable welding metal formed with longitudinal ribs or fins 30, the fins defining intervening longitudinal grooves 31. On this core 27 is spirally wound one or more current conducting strands in the form of metal wires 32, there being two such strands in the present embodiment of the invention positioned diametrically opposite each other.

The core 27 may be considered as comprising an inner solid rod 33 of circular cross-section with peripheral projections in the form of fins, the inner rod 33 being the solid mass of metal lying within a circle defined by the bottom surfaces of the grooves 31. This inner rod 33 is surrounded by a metal framework, the longitudinal elements of which framework are the fins 30, and the transverse elements of which are the spiral strands or wires 32. The sheath or coating of flux 21 occupies the spaces of the metal framework and is anchored to the inner rod 33 by the framework. The entire lengths of the spiral strands 32 may be exposed through the flux coating on the periphery of the finished electrode, but preferably are exposed only at points where the wires cross the fins 30.

The form of the electrode shown in Figures 3 to 6 may be fabricated by first passing a suitable wire or rod through forming rolls or, preferably, through a suitable drawing die. The forming operation consists of displacing the metal by drawing or rolling to form the plurality of longitudinal fins or ribs 30. The spiral metal strands 32 may then be wound on the ribbed core in any suitable manner.

In the preferred practice of my invention the winding of the strands on the ribbed core is carried out in such manner as to result in interlocking of the strands with the core ribs. By interlocking is meant that the winding of the strand wire or wires onto the core causes notches to be formed either in the core ribs for engaging the strands or in the strands for engaging the core ribs. Preferably the fabrication procedure results in mutual notching at each intersection of a strand with a core rib.

A simple procedure is to wind the strands around the core under such tension as to result in the desired notching, care being taken that the relative hardness of the metals involved be such as to favor the desired notching.

Instead of depending upon high tension stress in the strands at the points of initial contact with the ribs of the core to produce the notches, I may apply the strands with only moderate tension and employ suitable means, such as a shoe or roller, to press the strands radially inward against the core ribs as the strands are wound onto the core, the applied pressure being sufficient to cause the desired notching action.

Another procedure to accomplish substantially the same purpose is to draw the core through a suitable die immediately after the helical strands are applied to the core. In such a procedure any tendency for the die to strip the helical strands, i. e., move the helical strands longitudinally of the core, may be minimized or entirely eliminated by moving the wound core longitudinally through a drawing die that is fixed with respect to movement along its axis but rotates at a rate properly synchronized with the longitudinal movement of the core, the synchronization being in accord with the pitch or helical angle of the wound strand. In any of these procedures it is preferred that the notching be accomplished as the strands are applied to the core.

At first thought it would seem that minimum tendency for the spiral strands to unwind as the electrode is consumed would be achieved by using a soft and highly pliable strand wire. It has been found, however, that when a relatively hard strand wire is wound spirally onto the core and is forced into engagement with the ribs of the core the strand will be stressed beyond its yield point wherever it intersects a core rib, the strand being "set" to its wound configuration by such overstressing. Thus the strand wire may be wound onto the core under such high tensile stress as not only to cause the desired notching engagement with the ribs of the core but also to cause the desired "setting" of the strand wire. Producing the notches by radial pressure rather than by strand wire tension will also "set" the strand wire. After such setting occurs the stiffness of the strand wire is highly desirable since the stiffness results in substantial resistance to unwinding.

A satisfactory metal for both the strands and the electrode core is SAE 1010, in which the permissible range of carbon is eight to thirteen per cent.

In some practices of my invention the strand wire may be a relatively hard alloy selected for the purpose of adding special constituents to the weld metal. In such instances the strand wires may be notched by the core to little or no degree, but the ribs of the core will be adequately notched to engage the strands and anchor the wound strands against slippage or movement longitudinally of the core.

Figure 13:
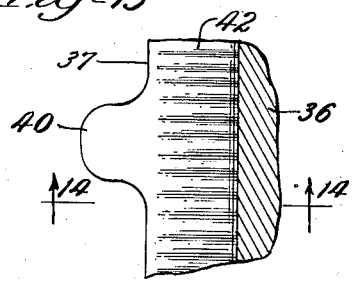
Figure 13 is a section on an enlarged scale taken as indicated by the line 13—13 of Figure 12.
Figure 14:
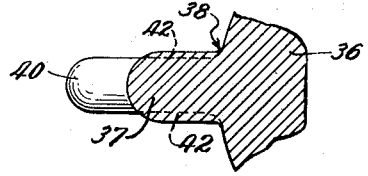
Figure 14 is a section taken as indicated by the line 14—14 of Figure 13.

The flux can be applied to the combined solid rod and metal framework by any suitable method. It is suggested that the flux be applied by an extrusion process with considerable pressure to ensure flux penetration of all the interstices of the metal framework. It is further suggested that the extrusion die be lined with medium hard rubber and that the inside diameter of the die be slightly smaller than the overall diameter of the metal framework. Such a coating procedure ensures that the spirally wrapped strands 32 will be bare at those points where the strands cross the ribs 30, and furthermore insures that the exposed portions of the spiral strands 32 will be wiped clean for efficient electrical contact during the welding operation. Since the flux shrinks somewhat on drying, adequate exposure of the spiral strands 32 is not a problem. If the spiral strands 32 are pulled straight from rib to rib, as heretofore suggested, the spiral strands may extend below the surface of the flux in passing from one rib to another, and preferably, but not necessarily, are so submerged as indicated in Fig. 13.

Although the strands or wires 32 do not have any substantial inherent tendency to unwind, nevertheless it may be desirable to secure the spiral strands at the ends of the electrodes to avoid damage in the course of handling, storage and transportation prior to the consumption of the electrode. For this purpose the ends of the spiral strands of the finished electrode may be suitably anchored to the electrode core, for example, by spot welding or soldering.

The manner in which the new electrode is employed and functions in welding operations is illustrated by Figs. 8 and 9. On comparing these figures with Figs. 1 and 2 it is apparent that the ten aspects of the ideal shielded electrode heretofore listed are to be found in the present electrode for automatic welding. The same crucible 22 is formed, and the same weld crater 25. The welding action is as completely shielded, and the welding gases are similarly confined for the creation of pressure and velocity as well as to exclude the atmosphere. In fact, for reasons that will be apparent the electrode shown in operation in Figs. 8 and 9 is a more efficient gas generator and will weld both deeper and faster than a shielded electrode of the construction shown in Figs. 1 and 2.

As much as 1000 amperes of current can be used with a ¼" electrode constructed in accord with the present invention, that is to say, an electrode the metal core of which is of the same cross-sectional area as a solid plain core ¼" in diameter. At this amperage ¼" welding rod is melted at the rate of 47 inches, or .63 pound of electrode per minute, and the welding action at such high amperage penetrates so deeply that an equal volume of base metal is converted into weld metal. Thus the combined weight of electrode metal and base metal that is melted and converted into weld metal at 1000 amperes totals approximately 1.26 pounds of metal per minute. The penetrating action is so effective that the usual necessity for beveling the edges of metal plates in preparation for welding is eliminated for all steel plates less than ½" thick. The elimination of this customary preparatory operation not only saves labor but also saves metal and results in the saved metal being converted into weld metal.

When the described electrode is used for automatic welding flange quality steel and the core of the electrode is .12 carbon steel, the physical properties of the weld deposit are as follows: tensile strength, 64,000 to 68,000 pounds per square inch; yield, 50,000 to 54,000 pounds per square inch; reduction in area 36% to 38%; elongation in two inches, 27% to 30%. It would be impossible to obtain this high quality of weld metal in automatic arc welding if the new welding rod did not have the features described and did not result in the various actions heretofore listed.

For proper understanding of the new electrode construction, and for guidance in constructing such electrode for specific purposes, it is desirable to consider carefully the requisite features of the described electrode that account for the new results in automatic welding.

Some of the requisites are the purely physical or structural requirements relating to the inverted crucible. Such requisites include the following:

(1) The flux coating must have a minimum thickness for sufficiently retarded consumption to extend downwardly a substantial distance from the melting electrode core.

(2) The flux coating must have sufficient thickness, moreover, to give the crucible wall sufficient strength to withstand substantial internal gas pressure.

(3) The flux coating must be substantially continuous around the circumference of the electrode or must approximate continuity sufficiently to confine the generated gases in the required manner. In Fig. 5 it will be noted that the flux coating is continuous all the way around the periphery of the encased electrode core 27, Fig. 5 being a transverse section taken between the points at which the spiral strands 32 cross over the ribs 30. It is apparent that even if the two spiral strands 32 are melted away in Fig. 5, no apertures or windows are formed in the flux coating. As indicated in Fig. 4, however, the spiral strands 32 do break the continuity of the crucible wall at spaced points, but the resultant apertures in the crucible wall do not seriously lessen the efficiency of the crucible because the openings are relatively small and appear only intermittently. When the apertures do appear in my preferred construction they are at diametrically opposed points, so that any escape of the gases therethrough is distributed and balanced.

(4) The flux coating that forms the crucible wall must be so effectively anchored as to withstand handling, shipping, reeling at the factory, unreeling at the point of use, mechanical engagement by the electrode feed mechanism, and the friction of brushes for applying electric current through the electrode. Such anchorage is provided by the described metal framework, and it will be noted that where the spiral strands 32 cross the grooves 31 the spiral strands lock the flux material against the electrode 27 in a positive manner.

(5) While a substantial portion of the metal employed in the electrode may be used in the framework, at least half of the metal should be within the solid diameter of the core for melting action in the center of the inverted crucible. In various practices of my invention, as exemplified by the drawings, from 55% to 80% of the total metal is represented by the solid diameter or what has been termed the inner rod 33.

Other requisites of the described electrode relate to the function of gas generation. Among these are the following requirements:

(1) Since the shielding gas is derived almost entirely from the flux coating, and since an exceptionally large volume of shielding gas is required for the new results, the metal framework must be so constructed as to provide a sufficient volume of open space for occupation by the flux.

(2) Since it is required that the shielding gas be generated at an exceptionally high rate, and since one factor determining the rate of generation is the area of flux exposed to the welding arc, it is necessary that the flux offer a relatively large inner surface per unit of length of the welding rod, a substantially larger area than provided by the plain welding rod in Fig. 1. The noncircular configuration of the inner surface of the flux coating in the new electrode results in this increased area.

(3) Since the use of alternating current is the usual practice in automatic welding, and since such current tends to concentrate at the surface of the conductor, it is desirable that the electrode core have a relatively large surface area per unit of length, a substantially larger surface ratio than is afforded by the electrode shown in Fig. 1. The ribbed or finned configuration of the new electrode core affords this increase in conducting surface.

(4) As a result of the ribbed configuration and the "skin effect" of alternating current, each of the ribs produces a small arc of relatively heavy current concentration, a series of such arcs being in operation around the circumference of the electrode core 27. It is readily apparent that a finned or ribbed electrode of the character described can carry current of higher amperage than the plain electrode of Fig. 1.

(5) Because heat generation is concentrated in the arc formed at each of the ribs 30, it is essential that an ample quantity of flux material be available for each of the arcs to act upon and that the individual arcs be as nearly surrounded by the flux material as possible. The re-entrant configuration of the flux coating of the new electrode provides the required volume of flux for each of the individual arcs, and, moreover, causes the individual arcs to be surrounded by flux on substantially three sides.

Tests and study of the above requisites have led to certain conclusions for guidance in fabricating the new electrode for superior results. In the first place, the ratio of total flux volume to total metal volume in the completed electrode for automatic welding will range between .75 for flux with relatively high mineral content, and 2.0 for flux with relatively low mineral content. The ratio will seldom exceed 1.75. This range is to be compared with the range of total flux volume to total metal volume in shielded electrode for manual welding, as exemplified by Fig. 1, which range is .78 to 1.23.

In the second place, more than four fins or ribs are required, and the preferred forms of my invention have more than five ribs. In general, the number of ribs is covered by the size of the core rod. It is preferred that welding rod $\frac{3}{32}''$ and $\frac{1}{8}''$ mean diameter be formed with six ribs; sizes $\frac{5}{32}''$, $\frac{3}{16}''$ and $\frac{1}{4}''$ mean diameter be formed with eight ribs, and sizes $\frac{5}{16}''$, $\frac{3}{8}''$ mean diameter, and larger, be formed with ten ribs.

In the third place, it has been found in practice that space for at least 30% of the total flux volume should be provided in the longitudinal grooves formed by the ribs; i. e., 30% of the cross-sectional area of the flux should lie within the circle defined by the outer edges of the ribs. In the initial practices of the invention a minimum of approximately 40% of the cross-sectional area of the total flux lies within such a circle. The minimum proportion of the flux within the stated circle is required not only to make possible the high rate of gas generation and to cause the flux consumption to lag behind the core consumption to the desired extent, but also to provide the mechanical anchorage of the flux to the electrode core.

Throughout this specification the depth of the grooves will be taken as the radial distance from the bottoms or innermost surfaces of the grooves to the circle defined by the outer edges of the ribs. To insure that an adequate proportion of the flux will lie within the grooves the depth of the grooves generally should be between .3 and .6 of the value $$\frac{\pi Dm}{N}$$

when the number of ribs range from six ribs for $\frac{1}{8}''$ electrode to ten ribs for a $\frac{3}{8}''$ electrode. As will be explained later, when the number of ribs is increased with the individual ribs made thinner to prevent substantial reduction in the proportion of the flux that lies in the grooves, the depth of the grooves may be between .3 and .6 of the value of $$\frac{\pi DmT}{N}$$

These formulas are purely empirical but express within the range of working tolerances the values preferred for obtaining the desired relationship between flux and metal and the disposition of the flux.

In the above expressions $Dm$ equals the mean diameter of the core, or the diameter of a circle having the same cross-sectional area as the ribbed core; $T$ is the ratio between the depth or radial dimension of the ribs and the thickness of the ribs taken at the mean diameter or mean circumference; and $N$ equals the number of ribs. In the initial commercial practice of the invention to be described hereafter the depth of the grooves is approximately $$.5\frac{\pi Dm}{N}$$

In the fourth place, the forming of the ribs of the electrode core should be so carried out that the final peripheral area of the core will be between one and one-quarter and two times the circumferential area of an equivalent plain rod. In general, increasing the peripheral area by half is desirable.

In the fifth place, the ratio of the diameter of the spirally wound strand to the mean diameter of the core should range downward from approximately .16 for a $\frac{1}{8}''$ electrode to approximately .10 for a $\frac{3}{8}''$ electrode, and the strands should be spaced apart longitudinally of the electrode not less than one-third of the electrode diameter measured across the ribs, and not more than three times that diameter.

Fortuitously, the described preferred embodiment of my invention is such that all of these requirements may be met without conflict. Thus the exceptionally large peripheral surface of the metal core to take advantage of the "skin effect" of alternating current fits in with the requirement for a relatively large inner surface of flux coating for rapid gas generation, and both of these requirements are consonant with the other requirements including the requirement of relatively deep grooves for mechanical anchorage of the flux and the requirement that the flux within the maximum diameter of the ribs be at least 30% of the total flux. In meeting these various requirements, moreover, there is no problem in the diameter, number and pitch of the spiral windings and it is not difficult to arrive at a spiral winding arrangement that will result in the desired minimum flux thickness, the desired total volume of flux and the desired avoidance of excessive venting of the crucible by apertures in the flux coating.

In Fig. 4, which may represent a $\frac{1}{8}''$ electrode, the ratio of the total flux volume to the total steel volume is 1.5. If a welding electrode with the same cross-sectional area of metal as in Fig. 4 is to be used with less current density, or is to be used with the same current density but with a flux composition having higher resistance to heat deterioration in the presence of an arc, the electrode core shown in Fig. 7 may be substituted for the electrode core shown in Fig. 4. The electrode core of Fig. 7 has thicker ribs and the diameter measured across the ribs is less. The ratio of total flux volume to total metal volume with the substituted electrode core would drop to .86. It is apparent that the ratio of total flux to total metal may be readily varied by varying the depth and configuration of the grooves, that is to say, starting with a plan rod or wire, various ratios of total flux to total metal may be achieved by the character of the rib-forming operation.

The importance of the ribbed configuration may be further understood by considering the function of the flux in the grooves of protecting or insulating the spiral winding from the arc. The winding is embedded in the wall of the inverted crucible to serve as a unitary part of that wall, and protecting the winding from the intense heat of the arc prevents premature melting of the winding, the spiral winding being melted only near the rim of the inverted crucible.

Figure 10 indicates how the spiral strands 32 may be anchored to the core 27 by spot welding at numerous points in one practice of the invention. The spot welds indicated by the numeral 34 not only serve to prevent the spiral strands from unwinding, but also provide numerous paths of solid continuous metal for flow of electric current from the periphery of the finished electrode to the electrode core.

Figure 11:
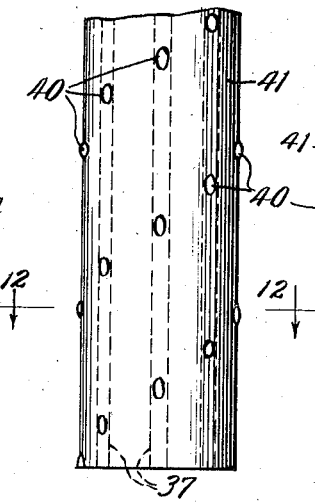
Figure 11 is a view similar to Figure 3, showing a modified form of my electrode.
Figure 12:
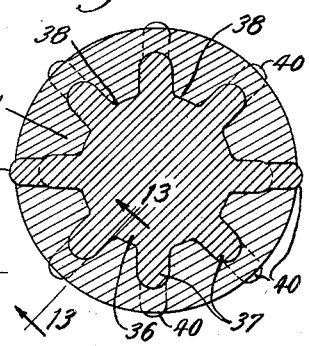
Figure 12 is a transverse section of the electrode shown in Figure 11.

The modified form of electrode shown in Figures 11 to 14 has much the same appearance as the preferred form of the invention, as may be seen by comparing Figure 11 with Figure 3. As shown in Figure 12, the electrode has a core 36 with longitudinal ribs 37 forming longitudinal grooves 38. At spaced points each of the ribs 37 is formed with projections or contact lugs 40 which are intended to extend through the flux coating 41 for contact with the brushes of the automatic welding machine. The contact lugs 40 perform the functions of the previously mentioned spiral windings. To favor anchorage of the flux coating to the electrode core the grooves 38 may be formed with transverse serrations 42.

Figure 15:
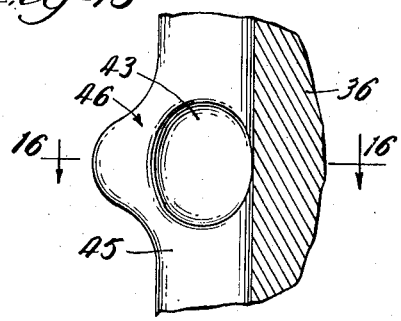
Figure 15 is a view similar to Figure 13, showing another modification of the electrode structure.
Figure 16:
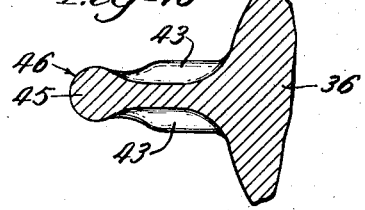
Figure 16 is a section taken on the line 16—16 of Figure 15.

The contact lugs 40 may be formed at the same time as the ribs 37 by using rib-forming rolls having recesses into which the metal is crowded to form the contact lugs. In another practice of the invention, however, the electrode may be formed with plain ribs and the contact lugs formed subsequently by pinching the ribs. Figs. 15 and 16, for example, show how pinching depressions 43 in the opposite side of a plain rib 45 results in the formation of an outwardly projecting contact lug 46. The depressions 43 assist in anchoring the flux coating.

Figs. 17 and 18 show core configurations used in the initial commercial practice of the invention. In general these configurations are characterized by smooth curved transitions that are highly satisfactory for cores to be formed by drawing dies. In these particular core configurations the ribs in cross-section and the grooves in cross-section have the same radius of curvature.

To arrive at the configuration shown in Figs. 17 and 18, the first step is to lay out the approximate mean circumference of the electrode core, that is to say, the circumference of a circle having an area substantially equal to the cross-sectional area of the desired ribbed core. Thus Fig. 17 may represent the core of an eighth inch welding rod, in which case the approximate mean circumference indicated at 50 has a diameter of one eighth of an inch. The next step is to lay out points on the approximate mean circumference 50 to divide the circle into twice as many parts as the number of ribs desired. For an eighth inch electrode six ribs are preferred, and therefore the approximate mean circumference 50 is divided into twelve equal parts by twelve equally spaced points 51. After these twelve points are located twelve equal contiguous circles are described with these twelve points as centers. One such circle is shown dotted at 52 in Fig. 17. Finally the finished outline of the core configuration is drawn by taking every other circle 52 for a rib configuration with the alternate circles 52 for groove configurations. In Fig. 17 the final configuration is shown in cross-section.

The diameter or circumference represented by the circle 50 in Fig. 17 is so close to the mean diameter that it may be considered the mean diameter, although actually the mean diameter or mean circumference is slightly larger than represented by the circle 50. The depth of the grooves in Fig 17 is equal to the diameter of the small circles 52, and since there are twice as many small circles 52 as there are ribs the depth of the grooves equals approximately $$\frac{\pi Dm}{2N}$$

or approximately .5 of the value $$\frac{\pi Dm}{N}$$

Fig. 17 shows the usual spiral strand 53 applied to the core.

Fig. 18 shows the core configuration employed in the initial commercial practice of the invention where eight ribs rather than six ribs are required. The procedure just described is followed to arrive at this figuration, the approximate mean circumference 50 in Fig. 18 being divided by sixteen equally spaced points instead of twelve points, so that sixteen small contiguous circles 52 may be drawn as a basis for arriving at the cross-sectional curvature of the eight ribs and the eight intervening grooves.

In laying out electrode cores in the manner shown in Figs. 17 and 18, I specify six ribs for electrode sizes $\frac{1}{8}$ and $\frac{5}{32}$; eight ribs for electrode sizes $\frac{3}{16}$ and $\frac{7}{32}$, and $\frac{1}{4}$ and $\frac{9}{32}$; and ten ribs for electrode sizes $\frac{5}{16}$ and $\frac{3}{8}$. The preferred diameters for the strand wires 53 are:

.016 for $\frac{1}{8}''$ electrode
.018 for $\frac{5}{32}''$ electrode
.020 for $\frac{3}{16}''$ electrode
.022 for $\frac{7}{32}''$ electrode
.024 for $\frac{1}{4}''$ electrode
.026 for $\frac{9}{32}''$ electrode
.030 for $\frac{5}{16}''$ electrode
.036 for $\frac{3}{8}''$ electrode These diameters of strand wire range in a straight line downward from approximately 16% of the mean diameter of the electrode for the smallest size to approximately 10% of the mean diameter of the electrode for the largest size.

Fig. 18ª shows, by way of example, how the electrode core of Fig. 18 can be changed in configuration by increasing the number of ribs without any substantial change in the volume of flux in the grooves. It will be noted that the number of ribs is increased but the thicknes of the ribs is decreased. The depth of the grooves in the core configuration shown in Fig. 18ᵃ is approximately .5 of the value $$\frac{\pi D_m T}{N}$$

Fig. 19 shows a cross-sectional core configuration obtained by employing a relatively long radius to lay out each of the grooves and a relatively short radius to lay out each of the ribs. The effect is to make the ribs thinner and thereby increase the proportion of total flux that lies within the circle defined by the outer edges of the ribs. In this configuration the depth of the grooves is approximately .6 of the value of $$\frac{\pi D_m}{N}$$

Fig. 20 shows a core having the same number of relatively thin ribs as Fig. 19. In the configuration exemplified by Fig. 20, however, the grooves may be relatively shallow, in fact as shallow as .3 of the value $$\frac{\pi D_m}{N}$$

The various advantages inherent in the new electrode for automatic welding may be understood in the light of solutions heretofore offered to the two problems of effectively uniting the flux coating with the core and of providing for current conduction through the flux.

One prior art solution practiced commercially is to provide the automatic welding machines with means to progressively cut away a longitudinal slot in the flux coating as the welding rod is progressively fed to the circuit-connected jaws of the machine. A slot of the same character is provided in other practices by equipping automatic welding machines with means to encase a bare electrode with flux material progressively as the electrode leaves the circuit-connected jaws. In this latter practice usually the flux material is in the form of a tape that is folded longitudinally around the rod to permit a small longitudinal spacing between the tape edges.

Both of these expedients undesirably encumber and complicate an automatic welding machine. Both expedients, moreover, require definite orientation of the welding rod with respect to the direction of relative longitudinal movement of the work, since the longitudinal slot releases shielding gas and therefore should be directed toward the end of the weld. Such orientation cannot be maintained to a satisfactory degree in practice because of the twist that is placed in the electrode core in the course of manufacture, especially by the usual wire drawing operation. The most serious disadvantage of the slotted electrode for automatic welding, however, is the loss of shielding gas through the slot, the loss being increased in practice because the slot is quickly widened by the flow therethrough of the arc generated gas stream.

A prior art suggestion that has not been sufficiently satisfactory for any substantial commercial use is to wind a conducting wire spirally on the usual plain electrode core, the spiral winding extending through the flux coating and being exposed at the periphery of the completed electrode. In such a construction the flux coating is in the form of one or more distinct and separate helical bands which form flux fingers instead of a flux crucible. The use of a longitudinally ribbed electrode core without any winding is unsatisfactory for the same reason, since the electrode ribs extending to the surface of the finished electrode divide the flux into separate longitudinal portions.

A prior art suggestion that has been used to a very limited extent in commercial practice is to braid a number of wires, usually twelve or more, around a plain core, the flux occupying the interstices of the braid wire and the wires being exposed in part at the surface of the flux for electrical contact. Such a construction is not only too difficult and too expensive to fabricate on a commercial scale, but is also inherently unsatisfactory since the interstices in the wire braid do not permit a sufficient volume of flux material. Increasing the diameter of the braid wires merely decreases the relative volume of the flux.

Because of the shielded electrode heretofore developed for automatic welding has been so unsatisfactory and has produced such poor welds, other practices of shielding not dependent on flux coatings have been employed. One of these practices is to feed a bare electrode automatically and to pipe shielding gases from a suitable source to the welding zone. Such a practice is limited to the use of relatively small diameter electrodes and minimum current densities. Gases suitable for the purpose, moreover, such as helium, neon and argon, are relatively rare and expensive.

Another practice involves the use of bare electrode, together with means to deposit flux in advance of the moving electrode, and to pick up the residue flux after the weld is formed. This latter practice has many disadvantages and cannot be employed for some types of work, especially where the seam to be welded is inclined substantially from the horizontal.

My description in specific detail of various practices of my invention for the purpose of disclosure will suggest to those skilled in the art various changes and substitutions without departing from my basic concepts, and I reserve the right to all such departures from my description that may lie within the scope of my appended claims.

I claim as my invention:

1. In a welding electrode for forming an arc enclosed by an inverted crucible, a metal core having a plurality of generally longitudinally extending ribs forming grooves, at least one conductor spirally wound on said core to cross said ribs in contact therewith, and a sheath of flux material occupying said grooves and overlying said ribs, said spiral conductor being exposed at the periphery of the electrode for electric conduction to said core, at least 30% of the total cross-sectional area of said sheath lying within a circle defined by the outer edges of said ribs.

2. In an electrode for arc welding, a metal core having a plurality of generally longitudinally extending ribs forming grooves, at least one conductor spirally wound on said core to cross said ribs in contact therewith, and a sheath of flux material occupying said grooves and overlying said ribs, said spiral conductor being exposed at the periphery of the electrode for electric conduction to said core, at least 30% of the total cross-sectional area of said sheath lying within a circle defined by the outer edges of said ribs, the ratio of the cross-sectional area of said sheath to the cross-sectional area of said core and spiral conductor being between .75 and 2.0.

3. In a welding electrode for forming an arc enclosed by an inverted crucible, a metal core having at least six generally longitudinally extending ribs forming grooves, at least one conductor spirally wound on said core to cross said ribs in contact therewith, and a sheath of flux material occupying said grooves and overlying said ribs, said spiral conductor being exposed at the periphery of the electrode for electric conduction to said core, said grooves being of such depth that at least 30% of the total cross-sectional area of said sheath lies within a circle defined by the outer edges of said ribs.

4. In an electrode for arc welding, a metal core having a plurality of generally longitudinally extending ribs forming grooves, a sheath of flux material occupying said grooves and overlying said ribs, and at least one spiral conductor wound on said core to cross said grooves thereby to lock the sheath material therein, said conductor being exposed at the surface of the sheath to form conducting paths from the surface of the electrode to said core, at least 30% of the total cross-sectional area of said sheath lying within a circle defined by the outer edges of said ribs, the ratio of the total cross-sectional area of said sheath to the total cross-sectional area of said core together with said spiral conductor being between .75 and 2.0.

5. In an electrode for arc welding, a metal core having a plurality of generally longitudinally extending ribs forming grooves, a sheath of flux material occupying said grooves and overlying said ribs, and at least one spiral conductor wound on said core to cross said grooves thereby to lock the sheath material therein, said conductor being exposed at the surface of the sheath to form conducting paths from the surface of the electrode to said core, at least 30% of the total cross-sectional area of said sheath lying within a circle defined by the outer edges of said ribs, the ratio of the total cross-sectional area of said sheath to the total cross-sectional area of said core together with said spiral conductor being between .75 and 2.0, more than 50% of the metal of said core lying inside a circle defined by the innermost surfaces of said grooves.

6. In a welding electrode for forming an arc enclosed by an inverted crucible, a metal core having a plurality of generally longitudinally extending ribs forming grooves, a sheath of flux material occupying said grooves and overlying said ribs, at least one conductor spirally wound on said core to cross said ribs in contact therewith, said spiral conductor being exposed at the periphery of the electrode for electrical conduction to said core, at least 30% of the total cross-sectional area of said sheath lying within a circle defined by the outer edges of said ribs, the turns of said conductor or conductors being spaced longitudinally of said core not less than one-third the maximum cross-sectional dimension of the core and not more than three times the maximum cross-sectional dimension of the core.

7. In a welding electrode for forming an arc surrounded by an inverted crucible, a metal core having generally longitudinal ribs forming grooves, said ribs and grooves being equally spaced, said ribs having in cross-sectional configuration a given radius of curvature, said grooves having in cross-sectional configuration substantially the same radius of curvature, a sheath of flux material enveloping said core, and a conductor extending around said core across said ribs to provide numerous conducting paths from the surface of the electrode through said sheath to said core.

8. In a welding electrode for forming an arc surrounded by an inverted crucible, a metal core having generally longitudinal ribs forming grooves, the depth of said grooves as measured from the circle defined by the outer edges of said ribs being approximately .3 to .6 of $$\frac{\pi Dm}{N}$$

in which $Dm$ is the diameter of a circle of the same area as the cross-section of the core and N equals the number of ribs, a sheathing of flux material occupying said grooves and overlying said ribs, and means providing conducting paths from the periphery of the electrode through said sheath to said core at numerous spaced points.

9. In a welding electrode for forming an arc surrounded by an inverted crucible, a metal core having generally longitudinal ribs forming grooves, the depth of said grooves as measured from the circle defined by the outer edges of said ribs being approximately .3 to .6 of $$\frac{\pi Dm}{N}$$

in which $Dm$ is the diameter of a circle of the same area as the cross-section of the core and N equals the number of ribs, a sheathing of flux material occupying said grooves and overlying said ribs, and a spiral conductor wound on said core across said ribs to provide numerous conducting paths from the surface of the electrode through said sheath to said core.

10. In a welding electrode for forming an arc surrounded by an inverted crucible, a metal core having generally longitudinal ribs forming grooves, the depth of said grooves as measured from the circle defined by the outer edges of said ribs being on the order of .5 of $$\frac{\pi Dm}{N}$$

in which $Dm$ is the diameter of a circle of the same area as the cross-section of the core and N equals the number of ribs, a sheathing of flux material occupying said grooves and overlying said ribs, and a spiral conductor wound on said core across said ribs to provide numerous conducting paths from the surface of the electrode through said sheath to said core.

11. In a welding electrode for forming an arc surrounded by an inverted crucible, a metal core having generally longitudinal ribs forming grooves, the depth of said grooves as measured from the circle defined by the outer edges of said ribs being approximately .3 to .6 of $$\frac{\pi DmT}{N}$$

in which $Dm$ is the diameter of the core or the diameter of a circle of the same area as the cross-section of the core, T is the ratio between the radial dimension of each of said ribs and the thickness of the rib on the circumference determined by said mean diameter, and N is the number of ribs, a sheathing of flux material occupying said grooves and overlying said ribs, and a spiral conductor wound on said core across said ribs to provide numerous conducting paths from the surface of the electrode through said sheath to said core.

12. In a welding electrode for forming an arc surrounded by an inverted crucible, a metal core having generally longitudinal ribs forming grooves, the depth of said grooves as measured from the circle defined by the outer edges of said ribs being on the order of .5 of $$\frac{\pi D_m T}{N}$$

in which $D_m$ is the diameter of the core or the diameter of a circle of the same area as the cross-section of the core, T is the ratio between the radial dimension of each of said ribs and the thickness of the rib on the circumference determined by said mean diameter, and N is the number of ribs, a sheathing of flux material occupying said grooves and overlying said ribs, and a spiral conductor wound on said core across said ribs to provide numerous conducting paths from the surface of the electrode through said sheath to said core.

13. In a welding electrode for forming an arc surrounded by an inverted crucible, a metal core having at least six generally longitudinally extending ribs forming grooves, the depth of said grooves as measured from the circle defined by the outer edges of said ribs being approximately .3 to .6 of $$\frac{\pi D_m}{N}$$

in which $D_m$ is the diameter of a circle of the same area as the cross-section of the core and N equals the number of ribs, a sheath of flux material occupying said grooves and overlying said ribs, and a spiral conductor wound on said core across said ribs to provide numerous conducting paths from the surface of the electrode through said sheath to said core, the ratio of the cross-sectional area of said sheath to the cross-sectional area of said core together with said spiral conductor being between .75 and 2.0.

14. In a welding electrode for forming an arc surrounded by an inverted crucible, a metal core, a sheath of flux encasing said core to form the circumferential wall of the inverted crucible, and a spiral conductor wound on said core to conduct current to the core, said spiral conductor being embedded in said sheath to serve as a structural part of said wall, said core having longitudinally extending ribs and grooves with the latter filled with flux forming a part of said sheath, the ratio of the flux within the grooves to the total amount of flux in the sheath being on the order of 30% or higher.

15. In a welding electrode for forming an arc surrounded by an inverted crucible, a metal core having generally longitudinal ribs forming grooves, the depth of said grooves as measured from the circle defined by the outer edges of said ribs being approximately .3 to .6 of $$\frac{\pi D_m}{N}$$

in which $D_m$ is the diameter of a circle of the same area as the cross-section of the core and N equals the number of ribs, a sheathing of flux material occupying said grooves and overlying said ribs, means providing conducting paths from the periphery of the electrode through said sheath to said core at numerous spaced points, and the amount of flux lying within the grooves being at least 30% of the total amount of flux contained within said sheathing.

16. In a welding electrode for forming an arc enclosed by an inverted crucible, a metal core having a plurality of generally longitudinally extending ribs forming grooves, a sheath of flux material occupying said grooves and overlying said ribs, and a spiral conductor wound on said core to cross said grooves thereby to lock the sheath material therein and to cross said ribs, said conductor being exposed at the surface of the sheath to form conducting paths from the surface of the electrode to said core, the continuity of said sheath around the surface of said core being broken by the contact of said spiral conductor with said ribs, but such contacts being spaced apart longitudinally of the core to afford sufficient continuity of flux around the electrode to permit said crucible to be formed around the arc.

17. In a welding electrode for forming an arc enclosed by an inverted crucible, a metal core having a plurality of generally longitudinally extending ribs forming grooves, a sheath of flux material occupying said grooves and forming a layer over the outer surface of said ribs, and at least one conductor spirally wound on said core to cross said ribs and grooves, said conductor being of substantially the same thickness as said layer of flux at said ribs so that the conductor is exposed on the periphery of the electrode at the points of contact with said ribs, said sheath being anchored by the portions of the spiral conductors extending across said grooves, the continuity of said sheath longitudinally of the electrode being broken by the contact of said spiral conductor with said ribs but the zones of such contact extending over substantially less than half the circumference of the electrode thereby affording sufficient longitudinal continuity of flux to permit said crucible to be formed around the arc.

18. In a welding electrode for forming an arc enclosed by an inverted crucible, a metal core having a plurality of generally longitudinally extending ribs forming grooves, said grooves extending over more than half of a circle defined by the outer edges of said ribs, at least one conductor spirally wound on said core to cross said ribs and grooves, and a sheath of flux material occupying said grooves and overlying said ribs in the spaces between the turns of said spiral conductor, said spiral conductor being exposed at least at the regions of contact with said ribs to provide paths for electrical current from the periphery of the electrode to said core.

19. In an electrode for arc welding, a metal core having a plurality of generally longitudinally extending ribs forming grooves, a sheath of flux material occupying said grooves and overlying said ribs, and a spiral conductor wound on said core to cross said grooves thereby to lock the sheath material therein, said conductor being exposed at the surface of the sheath to form conducting paths from the surface of the electrode to said ribs, said sheath being continuous around the periphery of said core over a major portion of the length of the electrode, the ratio of the cross-sectional area of said sheath to the cross-sectional area of said core together with said spiral conductor being between .75 and 2.0.

20. In an electrode for use in automatic arc welding at high current density for forming an arc enclosed by an inverted crucible, a metal core, a sheath of flux encasing said core, said metal core having a plurality of generally longitudinally extending grooves of sufficient depth to provide a surface on the order of at least one and one-half times the surface of a cylindrical core of the same cross-sectional area whereby the increased area of contact between the core and the flux results in gas generation at a high rate during welding, said flux forming a jacket around the core of sufficient minimum thickness at said ribs to lag substantially behind the core in consumption by the welding arc and to resist the pressure of said gas whereby the electrode forms a welding crucible to cause deep welding penetration, said ribs having at longitudinally spaced points thereon metal extensions to the surface of the electrode through said flux jacket.

21. In an electrode for use in automatic arc welding, a metal core having a plurality of generally longitudinally extending ribs forming grooves, a sheath of flux material occupying said grooves and overlying said ribs and at least one spiral conductor wound on said core to cross said grooves thereby to lock the sheath material therein, said conductor being welded at spaced points to said ribs and being exposed at the surface of said sheath to form conducting paths of continuous metal from the surface of the electrode to the center of the electrode, said sheath being continuous around the periphery of said core over a major portion of the length of the electrode.

22. In a welding electrode for forming an arc enclosed by an inverted crucible, a metal core having a plurality of relatively longitudinally extending ribs forming grooves, said grooves extending over more than half of a circle defined by the outer edges of said ribs, a sheath of flux material occupying said grooves and overlying said ribs and at least one spiral conductor wound on said core to cross said grooves thereby to lock the sheath material therein, said conductor being welded at spaced points to said ribs and being exposed at the surface of said sheath to form conducting paths of continuous metal from the surface of the electrode to the center of the electrode.

23. In a welding electrode for forming an arc enclosed by an inverted crucible, a metal core having a plurality of generally longitudinally extending ribs forming grooves, a sheath of flux material occupying said grooves and overlying said ribs, and a spiral conductor wound on said core to cross said grooves thereby to lock the sheath material therein and to cross said ribs, said conductor being exposed at the surface of the sheath only at the regions where said conductor crosses said ribs to form conducting paths from the surface of the electrode to said core, said sheath being continuous around the periphery of said core over a major portion of the length of the electrode.

24. In a welding electrode for forming an arc enclosed by an inverted crucible, a metal core having a plurality of generally longitudinally extending fins forming grooves, said grooves extending over more than half a circle defined by the outer edges of said fins, a sheath of flux material occupying said grooves and overlying said fins, and a plurality of spiral conductors wound on said core to cross said grooves thereby to lock the sheath material therein, said conductors being exposed at the surface of the sheath to form conducting paths from the surface of the electrode to the core, said sheath being continuous around the periphery of said core except at points where said conductors cross said fins, said conductors being equally spaced around said core and said fins being equally spaced around the core so that said points are equally spaced whereby any apertures formed in the sheath at said points during welding are equally distributed circumferentially for balanced escape therethrough of shielding gases.

25. In a welding electrode for forming an arc enclosed by an inverted crucible, a metal core having a plurality of generally longitudinally extending ribs forming grooves, said grooves extending over more than half a circle defined by the outer edges of said ribs, more than half of the metal of said core lying within a circle defined by the innermost surfaces of said grooves, at least one conductor spirally wound on said core to cross said ribs and grooves, and a sheath of flux material occupying said grooves and overlying said ribs in the spaces between the turns of said spiral conductor, said spiral conductor being exposed to provide paths for the electric current from the periphery of the electrode to said core.

26. In an arc welding electrode tending to form an arc enclosed by an inverted crucible, a metal core having a plurality of integral and generally continuous ribs defining grooves, said grooves extending over more than half a circle defined by the outer edges of said ribs, at least one conductor spirally wound on said core to cross said ribs and grooves, a sheath of flux material occupying said grooves and the spaces between said conductor, said conductor being exposed at the surface of the sheath to form conducting paths from the surface of the electrode to said core, the continuity of said sheath around the surface of said core being broken by the contact of the spiral conductor with said ribs, but such contacts being spaced apart longitudinally of the core to afford sufficient continuity of flux around the electrode to tend to form said crucible around said arc during the welding operation.

ARTHUR A. BERNARD.

REFERENCES CITED

The following references are of record in the file of this patent:

UNITED STATES PATENTS

| Number | Name | Date |
| --- | --- | --- |
| 1,944,753 | Mathias | Jan. 23, 1934 |